(12) United States Patent
Zhang et al.

(10) Patent No.: US 12,434,179 B2
(45) Date of Patent: Oct. 7, 2025

(54) FUEL-WATER SEPARATION FILTER ELEMENT AND FUEL FILTER

(71) Applicant: ZHEJIANG LAIEN FILTRATION SYSTEM CO., LTD., Huzhou (CN)

(72) Inventors: Yu Zhang, Huzhou (CN); Jianbin Cheng, Huzhou (CN); Xiaowei Ying, Huzhou (CN); Qinglin Deng, Huzhou (CN)

(73) Assignee: ZHEJIANG LAIEN FILTRATION SYSTEM CO., LTD., Huzhou (CN)

( * ) Notice: Subject to any disclaimer, the term of this patent is extended or adjusted under 35 U.S.C. 154(b) by 445 days.

(21) Appl. No.: 17/962,712

(22) Filed: Oct. 10, 2022

(65) Prior Publication Data
US 2024/0082762 A1 Mar. 14, 2024

(30) Foreign Application Priority Data
Sep. 13, 2022 (CN) .......................... 202211107083.5

(51) Int. Cl.
*B01D 36/00* (2006.01)
*B01D 17/02* (2006.01)
*B01D 29/13* (2006.01)
*F02M 37/24* (2019.01)
*F02M 37/34* (2019.01)

(52) U.S. Cl.
CPC ....... *B01D 36/001* (2013.01); *B01D 17/0214* (2013.01); *B01D 29/13* (2013.01); *F02M 37/24* (2019.01); *F02M 37/34* (2019.01); *B01D 2201/0446* (2013.01); *B01D 2201/34* (2013.01)

(58) Field of Classification Search
CPC .. B01D 36/001; B01D 17/0214; B01D 29/13; B01D 2201/0446; B01D 2201/34; B01D 17/0217; B01D 19/0057; B01D 36/003; B01D 36/006; F02M 37/24; F02M 37/34; F02M 37/26; F02M 37/28; F02M 37/32; F02M 37/54
See application file for complete search history.

(56) References Cited

U.S. PATENT DOCUMENTS

2018/0290086 A1* 10/2018 Grisham .............. B01D 17/045

FOREIGN PATENT DOCUMENTS

CN         113586300 A     11/2021

* cited by examiner

*Primary Examiner* — Waqaas Ali
(74) *Attorney, Agent, or Firm* — Ladas & Parry LLP (57) ABSTRACT

The present application provides a fuel-water separation filter element and a fuel filter. The filter element includes a fuel duct, a water blocking tube, and a filter medium. An upper cover plate is connected to one end of the fuel duct. The upper cover plate is formed with an air collection cavity in the fuel duct. The water blocking tube is provided with a water blocking portion positioned in the fuel duct, and a vent pin axially extends from an end surface of one end of the water blocking portion. The vent pin respectively communicates with the air collection cavity and the outside. During operation of the filter element in the present application, gas mixed into a fuel supply system may be effectively exhausted.

6 Claims, 6 Drawing Sheets

FUEL-WATER SEPARATION FILTER ELEMENT AND FUEL FILTER

CROSS REFERENCE TO RELATED APPLICATION

This application claims priority to Chinese Patent Application No. 202211107083.5, filed on Sep. 13, 2022, which is incorporated by reference in its entirety.

FIELD OF TECHNOLOGY

The present application relates to the technical field of fuel filtration of internal combustion engines, in particular to a fuel-water separation filter element and a fuel filter.

BACKGROUND

During operation of an internal combustion engine, fuel is delivered to a nozzle by a fuel supply system. There is relatively high negative pressure at the front end of a fuel pump. Under the action of the negative pressure, air dissolved in fuel will overflow, and air may also be sucked into a fuel delivery pipeline and connecting pieces due to poor sealing. After the fuel is heated, fuel vapor will also be produced due to evaporation of water dissolved in the fuel. During installation and maintenance of a filter, the air will also be mixed into the pipeline. If these gases are not exhausted in time, gas isolation will occur, resulting in unstable fuel supply in the fuel supply system, abnomial output power or even stalling and other problems of the internal combustion engine, and safety accidents.

In the prior art, disclosed in CN113586300A is an exhaust fuel filter, including a housing, a filter element assembly, and a screw seal plate, where a water discharge assembly is installed at the bottom of the housing, an annular gasket is installed between the screw seal plate and an upper end cover of the filter element assembly, and an exhaust channel is arranged in the annular gasket. It is recorded in a technical solution that "when gas gathered in a filter passes through a fuel outlet thereof, it will be exhausted from a fuel inlet through an exhaust channel of an annular gasket".

In this technical solution, two ends of the exhaust channel are respectively connected to the fuel outlet and the fuel inlet of this filter, such that a part of unfiltered fuel enters the fuel outlet from the fuel inlet through the exhaust channel, thereby reducing the filtration efficiency of the filter; the unfiltered fuel is delivered into a fuel nozzle, such that the nozzle is easily blocked and damaged; and in addition, the gas gathered in the filter of this technical solution is exhausted from the fuel inlet of the filter, a flow direction of the exhausted gas is opposite to a flow direction of the fuel, and a pressure of the fuel inlet of the filter is higher than a pressure of the fuel outlet, such that the gas cannot be effectively exhausted.

SUMMARY

In order to solve the technical problem that gas produced during operation of an existing fuel filter cannot be effectively exhausted, a main objective of the present application is to provide a fuel-water separation filter element and a fuel filter.

In order to achieve the above objective, the present application provides a fuel-water separation filter element, including:

a fuel duct, an upper cover plate being connected to one end of the fuel duct, and an air collection cavity being formed in the fuel duct;

a water blocking tube provided with a water blocking portion positioned in the fuel duct, the water blocking portion and an inner wall of the fuel duct being formed with a water sedimentation channel, a vent pin axially extending from an end surface of one end of the water blocking portion, the vent pin respectively communicating with the air collection cavity and the outside, an outer tube wall of the water blocking tube being connected to the other end of the fuel duct, and a lower cover plate being connected to an opening in the other end of the water blocking tube; and a filter medium arranged on the periphery of the fuel duct and the periphery of the water blocking tube, two ends of the filter medium being respectively connected to the upper cover plate and the lower cover plate.

Optionally, a plurality of helical ribs are arranged on an outer side wall of the fuel duct, and a flow channel for fuel is formed between the ribs.

Optionally, a fuel passing hole is formed between the two ribs on the outer side wall of the fuel duct.

Optionally, the vent pin includes a first pin communicating with the air collection cavity from the end surface and a second pin communicating to the outside from the end surface.

Optionally, a hole diameter of the second pin is 0.3-0.7 mm.

Optionally, the air collection cavity is formed with a first through hole communicating with the first pin and a second through hole communicating with the outside, and the first pin is hermetically connected to the first through hole.

Optionally, an elastic sealing element is arranged at a joint between the first pin and the first through hole.

Optionally, the other end of the water blocking portion is connected to a tube wall of a main body of the water blocking tube, and a drain hole is formed in the joint; and the drain hole communicates with the water sedimentation channel to discharge blocked water.

Optionally, the water blocking portion includes a water blocking medium and a tube frame for fixing the water blocking medium.

Optionally, flow guide ribs are arranged on a duct wall on an inner side of the fuel duct and at a position close to the water blocking portion, and are configured to position the water blocking portion.

The present application further provides a fuel filter, including:

the fuel-water separation filter element; and a housing assembly, the fuel-water separation filter element being arranged in the housing assembly.

Optionally, the housing assembly and an inner wall of the water blocking tube are formed with a water accumulation cavity and provided with a drain pipeline.

In the technical solution of the present application, the air collection cavity communicating with the assembly is formed in the fuel duct and the upper cover plate, and the vent pin is arranged to respectively communicate with the air collection cavity and the outside (such as a fuel tank), such that during operation of the filter, the vent pin can exhaust gas brought into the assembly from a pipeline and fuel to the outside (such as the fuel tank) in time. An exhaust channel and a fuel outlet are separated from each other, such that there is no possibility that unfiltered fuel enters the fuel outlet through the exhaust channel and is delivered to a fuel nozzle, thereby improving the filtration efficiency, protecting the nozzle, and effectively solving the exhaust problem of a fuel supply system.

BRIEF DESCRIPTION OF THE DRAWINGS

In order to more clearly illustrate the embodiments of the present application or the technical solution in the prior art, the accompanying drawings that need to be used in the description of the embodiments or the prior art will be briefly introduced below. Apparently, the accompanying drawings in the description below merely illustrate some embodiments of the present application. Those of ordinary skill in the art may also derive other accompanying drawings from structures shown in these accompanying drawings without creative efforts.

In the figures.

100: fuel-water separation filter element; 1: fuel duct; 11: partition; 12: rib; 13: flow channel: 14: fuel passing hole; 15: flow guide rib; 2: upper cover plate: 21: air collection cavity; 211: first through hole: 212: second through hole; 3: water blocking tube; 31: water blocking portion; 31*a*: water sedimentation channel; 31*b*: end surface; 311: water blocking medium; 312: tube frame; 32: vent pin; 321: first pin; 322: second pin; 323: elastic sealing element; 33: drain hole; 34: water accumulation cavity; 4: lower cover plate; 5: filter medium: 6: first sealing ring; 7: second sealing ring; 200: fuel filter; 201: housing assembly, 201*a*: exhaust pipeline; 201*b*: fuel discharge pipeline: 201*c*: drain pipeline; 201*d*: fuel feed channel: and 202: central stand column.

The objective achievement, functional characteristics, and advantages of the present application will be further illustrated with reference to the accompanying drawings in conjunction with the embodiments.

DETAILED DESCRIPTION

The technical solutions in the embodiments of the present application are clearly and completely described below with reference to the accompanying drawings in the embodiments of the present application. Apparently, the described embodiments are merely a part rather than all of the embodiments of the present application. All other embodiments obtained by those of ordinary skill in the art based on the embodiments of the present application without creative efforts shall fall within the scope of protection of the present application.

In order to better describe and illustrate the embodiments of the present application, one or more accompanying drawings may be referred to, but additional details or examples used to describe the accompanying drawings should not be considered to limit the scope of any one of creations, presently described embodiments, or preferred modes of the present application.

In the description of the present application, it should be noted that the orientational or positional relationships indicated by the terms "length", "width", "upper", "lower", "front", "back", "left". "right", "top", "bottom", "inside", "outside". etc. are based on the positional relationships shown in the accompanying drawings, are only used for the convenience of describing the present application rather than indicating that the referred device must have a specific orientation or be operated in a specific orientation, and therefore should not be construed as a limitation to the present application.

All technical and scientific terms used herein have the same meaning as commonly understood by those skilled in the art of the present application, unless otherwise defined. The terms used in the specification of the present application are only used for describing specific embodiments, and are not intended to limit the present application.

An existing fuel filter has the following problems: two ends of an exhaust channel respectively communicate with a fuel outlet and a fuel inlet of this filter, such that a part of unfiltered fuel enters the fuel outlet from the fuel inlet through the exhaust channel, thereby reducing the filtration efficiency of the filter; and in addition, gas gathered in the filter of this technical solution is exhausted from the fuel inlet of the filter, a flow direction of the exhausted gas is opposite to a flow direction of the fuel, and a pressure of the fuel inlet of the filter is higher than a pressure of the fuel outlet, such that the gas cannot be effectively exhausted.

In view of this, the present application provides a fuel-water separation filter element. FIGS. 1 to 4 show an embodiment of the fuel-water separation filter element provided by the present application. Referring to FIGS. 1 to 4, the fuel-water separation filter element 100 includes a fuel duct 1, a water blocking tube 3, and a filter medium 5.

An upper end of the fuel duct 1 is connected to an upper cover plate 2. The upper cover plate 2 axially extends into the fuel duct 1 to form an air collection cavity 21. Specifically, referring to FIGS. 1 and 2, a partition 11 is arranged in the fuel duct 1, a space defined by the partition 11 and the upper cover plate 2 is the air collection cavity 21, and the air collection cavity 21 communicates with the inside of an assembly to collect gas brought into the assembly from a pipeline and fuel. The water blocking tube 3 is provided with a water blocking portion 31 positioned in the fuel duct 1. The water blocking portion 31 is configured to block water in the fuel and allow the fuel to pass through a nozzle of an engine. A water blocking outer side of the water blocking portion 31 and an inner wall of the fuel duct 1 are formed with a water sedimentation channel 31*a*. The fuel passes through the water sedimentation channel 31*a*, such that the blocked water is sedimented at the bottom thereof. In addition, an end surface 31*b* of one end of the water blocking portion 31 is an end surface 31*b* facing the air collection cavity 21 in this embodiment. A vent pin 32 axially extends from the end surface. The vent pin 32 is integrally formed on the end surface 31*b*, and respectively communicates with the air collection cavity 21 and the outside (such as a fuel tank). The vent pin 32 can exhaust the gas brought into the assembly from the pipeline and the fuel to the outside. One end of a main body of the water blocking tube 3 is connected to the other end of the fuel duct 1, that is, two tubular objects are connected correspondingly, and a lower cover plate 4 is connected to an opening in the other end of the main body of the water blocking tube 3. The filter medium 5 is sleeved on the periphery of the fuel duct 1 and the periphery of the water blocking tube 3, and two ends thereof are respectively connected to the upper cover plate 2 and the lower cover plate 4. It should be noted that the filter medium 5 is a hydrophilic filter material, can absorb water with the fine particle size in the fuel and gather it into water with the relatively large particle size, and may filter out particulate impurities. In this embodiment, the fuel duct 1 is connected to the upper cover plate 2 by hot melt welding, the filter medium 5 is connected to the upper cover plate 2 and the lower cover plate 4 by hot melt welding, of course, they may also be connected by other manners such as an adhesive, which will not be enumerated one by one here.

In the technical solution of the present application, the air collection cavity 21 communicating with the assembly is formed in the fuel duct 1 and the upper cover plate 2, and the vent pin 32 is arranged to respectively communicate with the air collection cavity 21 and the outside (such as the fuel tank), such that during operation of the filter, the vent pin 32 can exhaust the gas brought into the assembly from the pipeline and the fuel to the outside, and the filtration efficiency of the filter element during operation can be improved.

Figure 1:
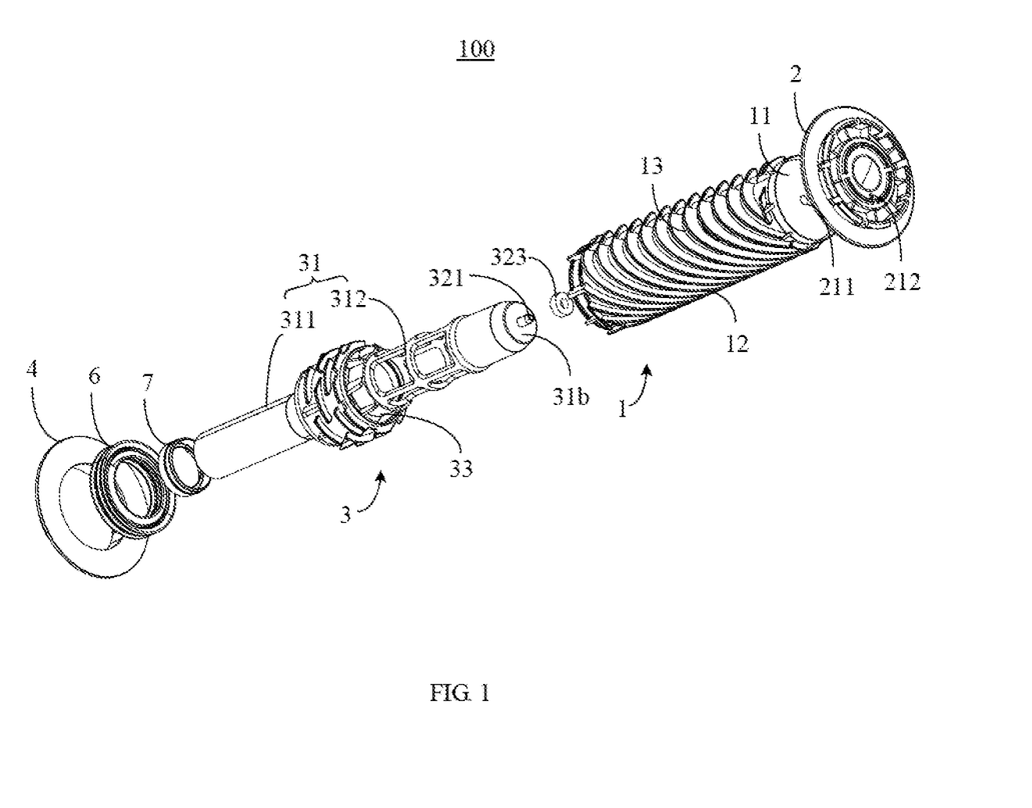
FIG. 1 is an exploded view of an embodiment of a fuel-water separation filter element provided by the present application.
Figure 2:
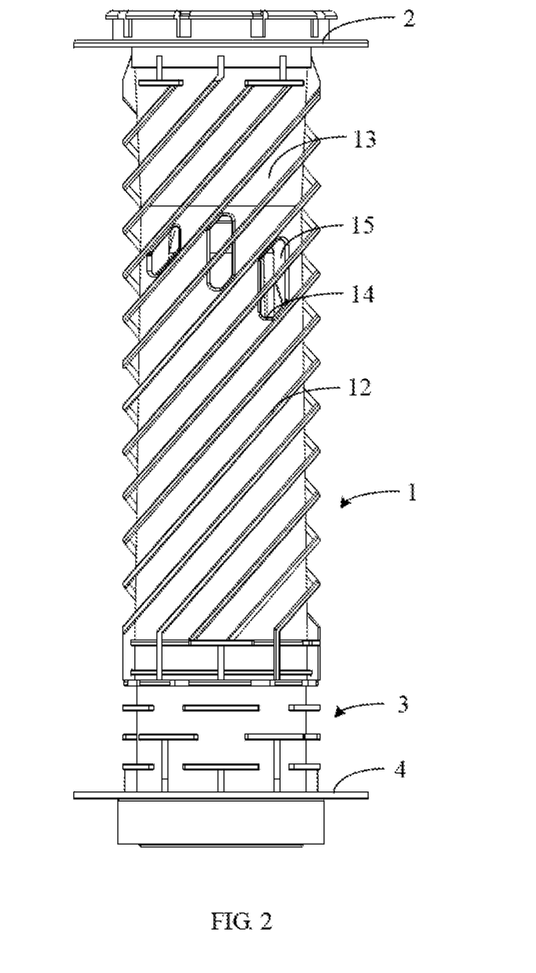
FIG. 2 is a front view of an embodiment of the fuel-water separation filter element provided by the present application.

Referring to FIGS. 1 and 2, in an embodiment of the present application, a plurality of helical ribs 12 are arranged on an outer side wall of the fuel duct 1, and a flow channel 13 for the fuel is formed between the ribs 12.

Further, referring to FIG. 2, an oil passing hole 14 is formed in an outer side wall of the fuel duct 1, and the oil passing hole 14 is positioned between the two ribs 12. The fuel filtered by the filter medium 5 and the water with the relatively large particle size are orderly connected by the helical flow channel 13 and flow from the fuel passing hole 14 into the water sedimentation channel 31*a* in the fuel duct 1. It should be noted that there may be a plurality of fuel passing holes 14, and the number of fuel passing holes may be appropriately selected according to the number of the ribs 12.

Figure 3:
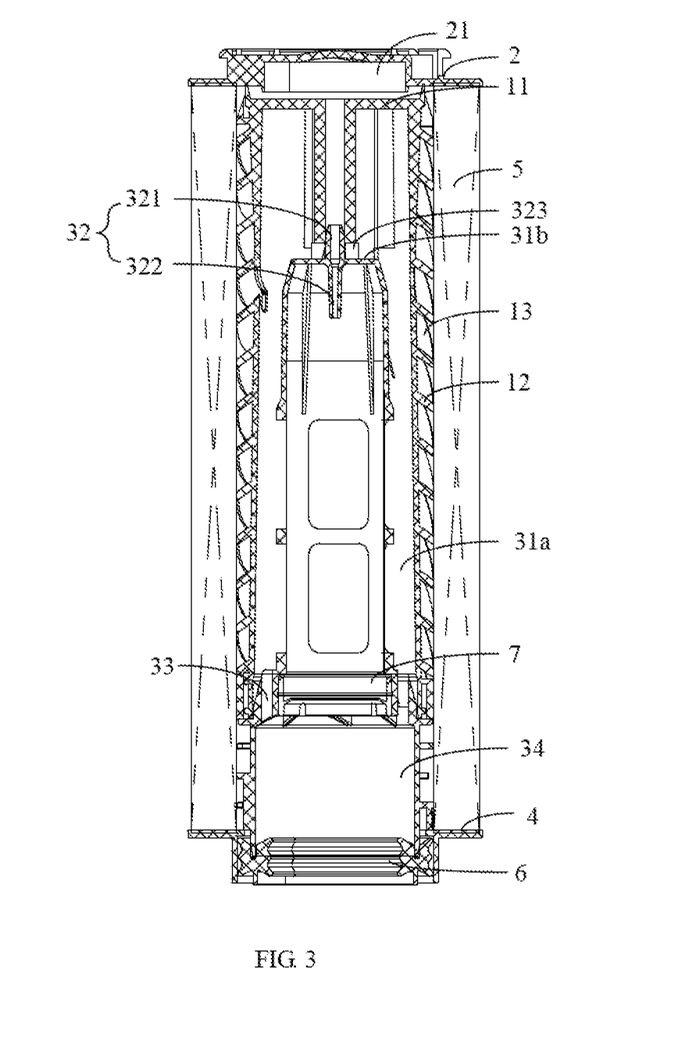
FIG. 3 is a cross-sectional view of an embodiment of the fuel-water separation filter element provided by the present application.

Referring to FIG. 3, in an embodiment of the present application, the vent pin 32 includes a first pin 321 communicating with the air collection cavity 21 from the end surface 31*b* and a second pin 322 communicating to the outside (such as the fuel tank) from the end surface 31*b*. It should be understood that the water blocking tube 3 and the fuel duct 1 are installed separately, so the first pin 321 and the air collection cavity 21 in this embodiment are connected in an abutted and sealed manner. Of course, the implementation of the present application is not limited thereto. The first pin 321 may also be integrally formed together with the air collection cavity 21, that is to say, the first pin 321 axially extends from the partition 11, and the second pin 322 abuts against the end surface 31*b*.

Further, the air collection cavity 21 is formed with a first through hole 211 communicating with the first pin 321 and a second through hole 212 communicating with the inside of the assembly. In this embodiment, the first through hole 211 is formed in the center of the partition 11, and the first through hole 211 is a long channel; and the second through hole 212 is formed in the upper cover plate 2, and the first pin 321 is hermetically connected to the first through hole 211. It should be noted that the hole diameter of the first pin 321 is much larger than the hole diameter of the second pin 322, such that the installation is more convenient and the pins are not easily damaged.

Figure 6:
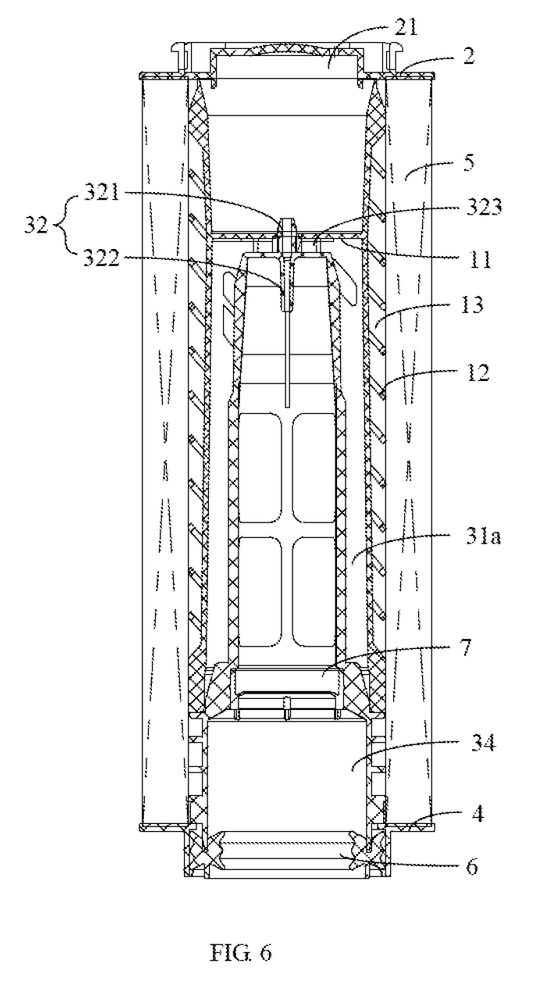
FIG. 6 is a cross-sectional view of another embodiment of the fuel-water separation filter element provided by the present application.

In addition, referring to FIG. 6 that shows another embodiment of the fuel-water separation filter element provided by the present application, the first through hole 211 is a circular through hole. A difference from the previous embodiment is that the space of the air collection cavity 21 is larger in this structure.

Furthermore, an elastic sealing element 323 is arranged at a joint between the first pin 321 and the first through hole 211. By arranging the elastic sealing element 323, the sealing effect between the first pin 321 and the first through hole 211 may be improved, and the gas and the unfiltered fuel may be prevented from entering the fuel duct 1 and the engine. It should be noted that the elastic sealing element 323 is made of rubber, of course, it may be made of other materials with the sealing effect, which will not be repeated in detail here.

In an embodiment of the present application, a hole diameter of the second pin 322 is 0.3-0.7 mm. This hole diameter is selected to allow the gas to pass through quickly and allow a small amount of the fuel to pass through. The too small hole diameter easily causes blockage and makes it impossible to exhaust the collected gas quickly, while the too large hole diameter will cause a large amount of the fuel to be discharged to bring about fuel supply pressure loss and insufficient fuel supply pressure.

In an embodiment of the present application, the other end of the water blocking portion 31 is connected to the tube wall of the main body of the water blocking tube 3. It should be noted that the water blocking portion 31 is also set to be in a tubular shape, and the other end thereof is integrally formed together with the main body of the water blocking tube 3. Since the water blocking portion 31 is smaller than the main body of the water blocking tube 3, a drain hole 33 may be formed at a joint between the water blocking portion and the main body of the water blocking tube. Referring to figure, the drain hole 33 communicates with the water sedimentation channel 31*a*, and a water accumulation cavity 34 is formed in the main body of the water blocking tube 3 to collect and accommodate the blocked and sedimented water, and the collected and accommodated water is discharged from the assembly.

Referring to FIG. 1, it should be noted that the water blocking portion 31 includes a tubular water blocking medium 311 and a tube frame 312 for fixing the water blocking medium 311. The water blocking medium 311 is a fuel-water separation membrane with the characteristics of water repelling and fuel passing. The tube frame 312 and the water blocking medium 311 are integrally injection-molded. The end cover is integrally formed at a top end of the tube frame 312. Moreover, a base of the tube frame 312, that is, a base of the water blocking portion 31 is integrally formed together with the water blocking tube 3.

Figure 4:
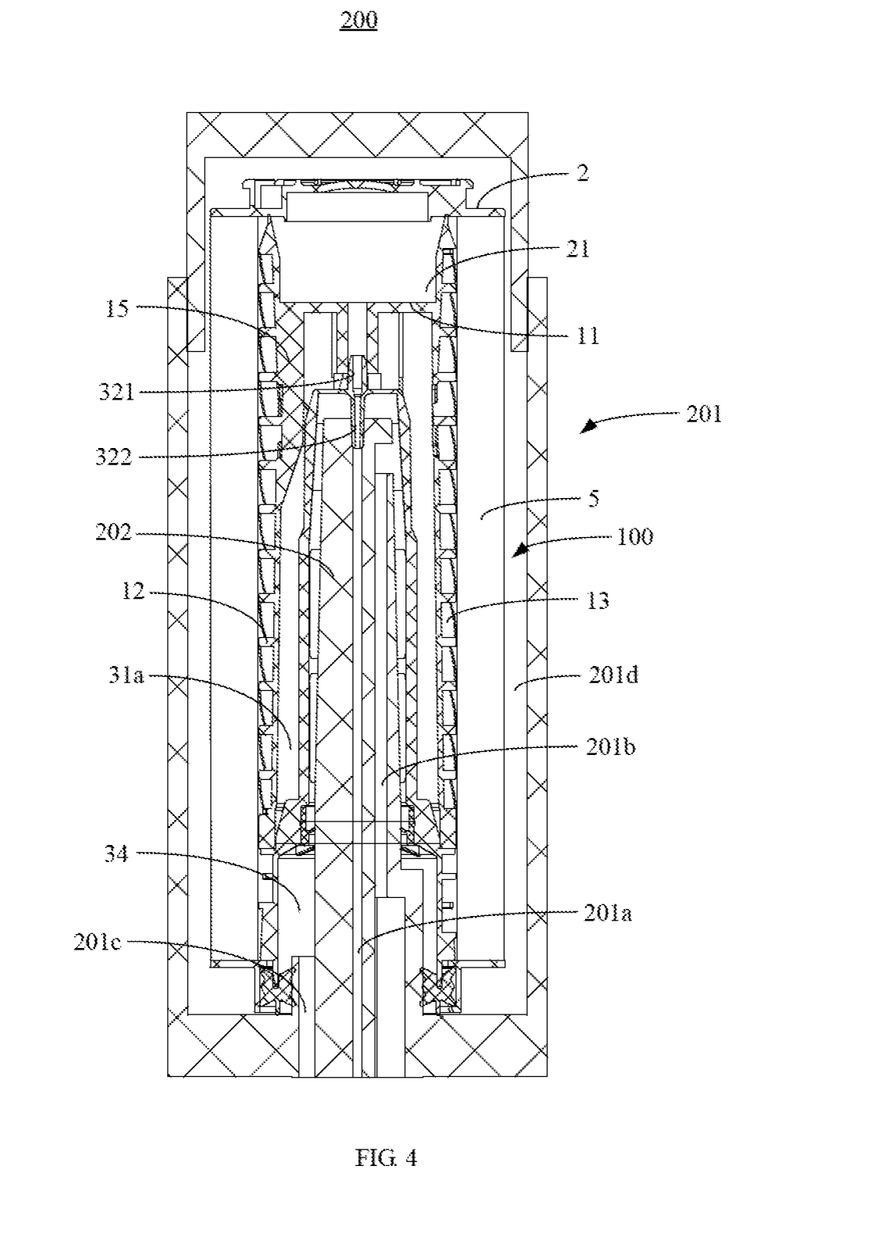
FIG. 4 is a cross-sectional view of an embodiment of a fuel filter provided by the present application.

Referring to FIG. 4, in an embodiment of the present application, flow guide ribs 15 are arranged on a duct wall on an inner side of the fuel duct 1. There are a plurality of the flow guide ribs 15 that are close to the water blocking portion 31 and are configured to position the water blocking portion 31 to prevent the water blocking portion 31 from shaking to weaken the sealing effect of the elastic sealing element 323.

Figure 5:
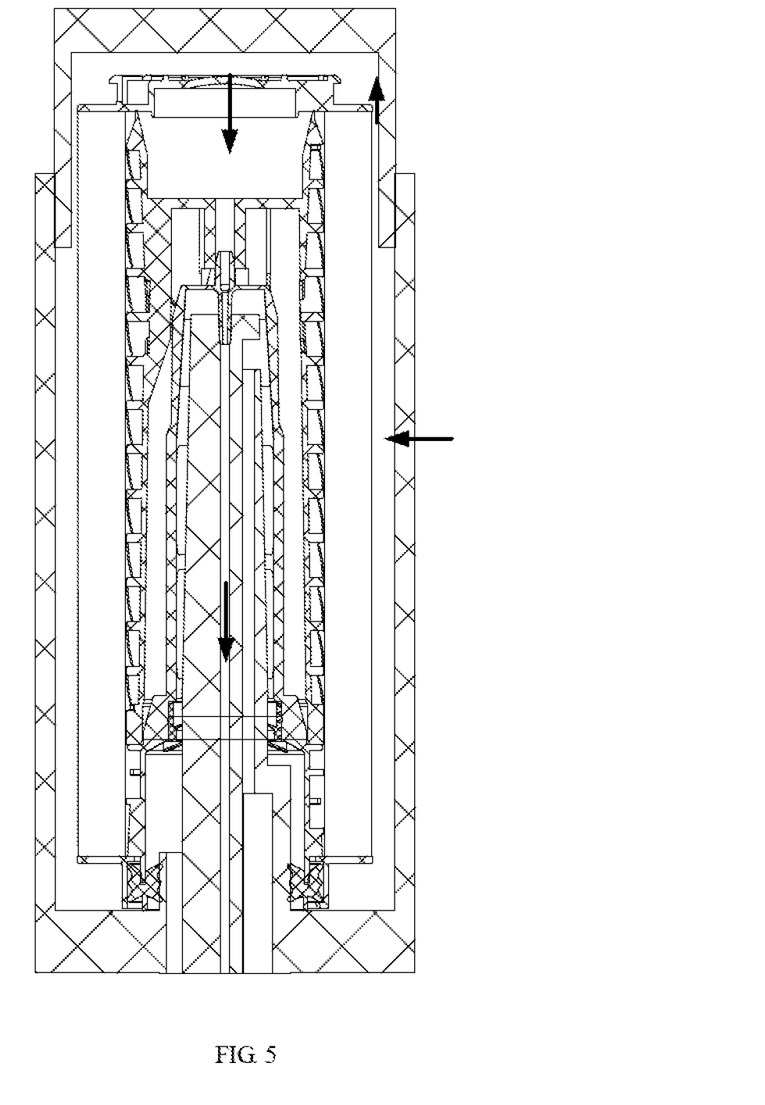
FIG. 5 is a flow schematic diagram of gas in the fuel filter provided by the present application.

The present application further provides a fuel filter. FIGS. 4 to 5 show an embodiment of the fuel filter provided by the present application. Referring to FIGS. 4 to 5, the fuel filter 200 includes a fuel-water separation filter element and a housing assembly 201. The housing assembly 201 is provided with a central stand column 202, where the fuel-water separation filter element is the above fuel-water separation filter element 100, the fuel-water separation filter element 100 is arranged in the housing assembly 201 and is sleeved on the central stand column 202, and the joint is sealed by a first sealing ring 6 and a second sealing ring 7.

Specifically, referring to FIG. 4, the central stand column 202 is provided with an opening respectively communicating with each pipeline, an exhaust pipeline 201a and a fuel discharge pipeline 201b of the housing assembly 201 are arranged in the water blocking portion 31, and the exhaust pipeline 201a communicates with the second pin 322. In addition, a drain pipeline 201c is further arranged, the drain pipeline 201c communicates with the water accumulation cavity 34 formed in an inner wall of the water blocking tube 3, and the water accumulation cavity 34 is separated from a fuel feed channel 201d and the fuel discharge pipeline 201b by the first sealing ring 6 and the second sealing ring 7.

Referring to FIGS. 4 and 5, during operation of the filter, the fuel mixed with the air enters the assembly, then enters the exhaust pipeline 201a through the air collection cavity 21, and is discharged to the outside (such as the fuel tank).

It should be understood that the housing assembly 201 is further provided with a water level sensor and a drainage device (not shown in figure). The water level sensor is configured to monitor the water level of the water accumulation cavity to prompt drainage treatment when the water in the fuel is sedimented to a certain height.

The technical features of the above embodiments may be combined arbitrarily. For the sake of brevity, all possible combinations of the technical features in the above embodiments are not described. However, the combinations of these technical features should be considered to be within the scope of this specification as long as there is no contradiction between them.

The above embodiments only express several implementations of the present application and are described more specifically and in details, but they should not be construed as a limitation to the scope of the patent of the application. It should be pointed out that those of ordinary skill in the art may also make several modifications and improvements without departing from the conception of the present application, and these modifications and improvements fall within the scope of protection of the present application. Therefore, the scope of protection of the patent of the present application should be determined by the appended claims.

What is claimed is:

1. A fuel-water separation filter element, comprising:
    a fuel duct, an upper cover plate being connected to one end of the fuel duct, and an air collection cavity being formed in the fuel duct, wherein a plurality of helical ribs are arranged on an outer side wall of the fuel duct, a flow channel for fuel is formed between the ribs, and a fuel passing hole is formed between the two ribs on the outer side wall of the fuel duct;
    a water blocking tube provided with a water blocking portion positioned in the fuel duct, the water blocking portion and an inner wall of the fuel duct being formed with a water sedimentation channel, a vent pin axially extending from an end surface of one end of the water blocking portion, the vent pin respectively communicating with the air collection cavity and the outside, an outer tube wall of a main body of the water blocking tube being connected to the other end of the fuel duct, and a lower cover plate being connected to an opening in the other end of the main body of the water blocking tube; and
    a filter medium arranged on the periphery of the fuel duct and the periphery of the water blocking tube, two ends of the filter medium being respectively connected to the upper cover plate and the lower cover plate;
    wherein the vent pin comprises a first pin communicating with the air collection cavity from the end surface and a second pin communicating to the outside from the end surface;
    wherein the air collection cavity is formed with a first through hole communicating with the first pin and a second through hole communicating with the inside of an assembly, and the first pin is hermetically connected to the first through hole; and
    wherein a hole diameter of the second pin is 0.3-0.7 mm.

2. The fuel-water separation filter element according to claim 1, wherein an elastic sealing element is arranged at a joint between the first pin and the first through hole.

3. The fuel-water separation filter element according to claim 1, wherein the other end of the water blocking portion is connected to the outer tube wall of the main body of the water blocking tube, and a drain hole is formed in the joint; and the drain hole communicates with the water sedimentation channel to discharge blocked water.

4. The fuel-water separation filter element according to claim 1, wherein the water blocking portion comprises a water blocking medium and a tube frame for fixing the water blocking medium.

5. The fuel-water separation filter element according to claim 3, wherein flow guide ribs are arranged on a duct wall on an inner side of the fuel duct and at a position close to the water blocking portion, and are configured to position the water blocking portion.

6. A fuel filter, comprising:
    a fuel-water separation filter element; and
    a housing assembly, the fuel-water separation filter element being arranged in the housing assembly;
    wherein the fuel-water separation filter element comprises:
    a fuel duct, an upper cover plate being connected to one end of the fuel duct, and an air collection cavity being formed in the fuel duct, wherein a plurality of helical ribs are arranged on an outer side wall of the fuel duct, a flow channel for fuel is formed between the ribs, and a fuel passing hole is formed between the two ribs on the outer side wall of the fuel duct;
    a water blocking tube provided with a water blocking portion positioned in the fuel duct, the water blocking portion and an inner wall of the fuel duct being formed with a water sedimentation channel, a vent pin axially extending from an end surface of one end of the water blocking portion, the vent pin respectively communicating with the air collection cavity and the outside, an outer tube wall of a main body of the water blocking tube being connected to the other end of the fuel duct, and a lower cover plate being connected to an opening in the other end of the main body of the water blocking tube; and
    a filter medium arranged on the periphery of the fuel duct and the periphery of the water blocking tube, two ends of the filter medium being respectively connected to the upper cover plate and the lower cover plate;
    wherein the vent pin comprises a first pin communicating with the air collection cavity from the end surface and a second pin communicating to the outside from the end surface:
    wherein the air collection cavity is formed with a first through hole communicating with the first pin and a second through hole communicating with the inside of an assembly, and the first pin is hermetically connected to the first through hole; and
    wherein a hole diameter of the second pin is 0.3-0.7 mm.

* * * * *